(12) United States Patent
Jung et al.

(10) Patent No.: US 11,276,132 B2
(45) Date of Patent: Mar. 15, 2022

(54) DATA PROCESSING METHOD AND SENSOR DEVICE FOR PERFORMING THE SAME

(71) Applicant: Samsung Electronics Co., Ltd., Suwon-si (KR)

(72) Inventors: Sangil Jung, Yongin-si (KR); Changyong Son, Anyang-si (KR); Jinwoo Son, Seoul (KR); Jaehyoung Yoo, Seongnam-si (KR); Changin Choi, Suwon-si (KR); Jaejoon Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/929,197

(22) Filed: Jul. 15, 2020

(65) Prior Publication Data

US 2021/0241408 A1 Aug. 5, 2021

(30) Foreign Application Priority Data

Jan. 30, 2020 (KR) .................. 10-2020-0011153

(51) Int. Cl.
 *G06T 1/00* (2006.01)
 *G06T 1/60* (2006.01)
 *G06T 5/20* (2006.01)

(52) U.S. Cl.
 CPC ............. *G06T 1/0007* (2013.01); *G06T 1/60* (2013.01); *G06T 5/20* (2013.01); *G06T 2207/10024* (2013.01); *G06T 2207/20024* (2013.01)

(58) Field of Classification Search
 CPC .................. G06T 1/0007; G06T 1/60
 See application file for complete search history.

(56) References Cited

U.S. PATENT DOCUMENTS

| | | | |
|---|---|---|---|
| 6,683,645 B1 | 1/2004 | Collins et al. | |
| 9,858,636 B1 | 1/2018 | Lim et al. | |
| 2013/0251255 A1* | 9/2013 | Nakanishi | H04N 19/182 382/166 |
| 2018/0315155 A1* | 11/2018 | Park | G06N 3/0454 |

(Continued)

FOREIGN PATENT DOCUMENTS

| | | |
|---|---|---|
| EP | 1 315 367 A2 | 5/2003 |
| JP | 7-240841 A | 9/1995 |

(Continued)

OTHER PUBLICATIONS

Shahdoosti, Hamid Reza et al., "Spectral-spatial feature extraction using orthogonal linear discriminant analysis for classification of hyperspectral data", *European Journal of Remote Sensing*, Feb. 6, 2017 (pp. 1-15).

(Continued)

*Primary Examiner* — Shivang I Patel
(74) *Attorney, Agent, or Firm* — NSIP Law

(57) ABSTRACT

Disclosed are an image data processing method and a sensor device performing the same. The sensor device includes an image sensor configured to acquire image data, an image buffer configured to store the image data, and an image processor configured to generate image-processed data by applying a filter corresponding to a storage pattern of the image buffer to the image data stored in the image buffer.

23 Claims, 11 Drawing Sheets

(56) References Cited

U.S. PATENT DOCUMENTS

2019/0108618 A1* 4/2019 Hwang .................. G06N 3/08
2019/0347550 A1 11/2019 Jung et al.

FOREIGN PATENT DOCUMENTS

| WO | WO 2007/054931 A2 | 5/2007 |
| WO | WO 2008/087627 A2 | 7/2008 |
| WO | WO 2019/245117 A1 | 12/2019 |

OTHER PUBLICATIONS

Zhu, Huifeng et al., "CMOS Image Sensor Data-Readout Method for Convolutional Operations with Processing Near Sensor Architecture", 2018 IEEE Asia Pacific Conference on Circuits and Systems (APCCAS), 2018 (pp. 528-531).
Extended European Search Report dated Jun. 2, 2021, in Counterpart European Patent Application No. 20214980.3 (10 pages in English).

* cited by examiner

DATA PROCESSING METHOD AND SENSOR DEVICE FOR PERFORMING THE SAME

CROSS-REFERENCE TO RELATED APPLICATIONS

This application claims the benefit under 35 USC § 119(a) of Korean Patent Application No. 10-2020-0011153 filed on Jan. 30, 2020 in the Korean Intellectual Property Office, the entire disclosure of which is incorporated herein by reference for all purposes.

BACKGROUND

1. Field

The following description relates to image data processing.

2. Description of Related Art

Various types of image data processing techniques are been actively used, including techniques for changing an image represented by data to suit a purpose, and is used for image manipulation, image analysis, image recognition, and image communication. Among the various image data processing techniques, convolution processing is widely used for a blurring effect or a sharpening effect. In an example, the convolution processing is a processing method that multiplies pixel values of a central pixel and its adjacent pixels in image data by a weight (or coefficient) assigned to a filter (or mask), and assigns a result value corresponding to the sum thereof as the pixel value of the central pixel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided sensor device including an image sensor configured to acquire image data, an image buffer configured to store the image data, and an image processor configured to generate image-processed data by applying a filter corresponding to a storage pattern of the image buffer to the image data stored in the image buffer.

The sensor device may be configured to select the filter corresponding to the storage pattern of the image buffer from among filters of different patterns and to apply the selected filter to the image data stored in the image buffer.

A number of filters of different patterns may be determined based on a number of lines of image data that can be stored in the image buffer and a size of the filters.

The sensor device may be configured to select a filter of a pattern for image data currently stored in the image buffer from among filters of a plurality of patterns, based on a buffer area in which the image data has been most recently stored in the image buffer.

The may be configured to generate, as the image-processed data, convolution-processed image data by applying a convolution filter for convolution processing to the image data stored in the image buffer.

The convolution processing with respect to the image data stored in the image buffer may be performed in the sensor device.

The may be configured to output a line of a result image by applying a convolution filter to the image data stored in the image buffer, in response to a line of the image data being input and stored in the image buffer.

The sensor device may be configured to store the image data comprising pixels of a plurality of color components arranged in a pattern, and the image processor may be configured to generate the image-processed data by applying a filter corresponding to the pattern to the image data stored in the image buffer.

The image processor may be configured to apply a first filter corresponding to an arrangement pattern of first color components in the pattern to the image data stored in the image buffer, and apply a second filter corresponding to an arrangement pattern of second color components in the pattern to the image data stored in the image buffer.

The first color components and the second color components may be different color components, and the first filter and the second filter are alternately applied to pixels of the image data stored in the image buffer.

The image buffer may be configured to sequentially store a portion of the image data acquired by the image sensor in a unit of lines.

The image processor may be configured to apply the filter to the image data stored in the image buffer and to generate quantized image data by quantizing the filter-applied image data.

The sensor device may include an output interface configured to transmit the image-processed data to an outside of the sensor device.

The image buffer may be configured to sequentially overwrite a line of the image data.

The image processor may be configured to select a filter for image data currently stored in the image buffer from among filters of a plurality of patterns, based on a recently changed line of image date in the image buffer.

The output interface may be configured to transmit the image-processed data to an outside of the sensor device, in response to an object being detected in the image-processed data.

In another general aspect, there is provided an image data processing method performed by a sensor device, the image data processing method including acquiring image data using an image sensor, storing the acquired image data in an image buffer, and generating image-processed data by applying a filter corresponding to a storage pattern of the image buffer to the image data stored in the image buffer.

The generating of the image-processed data may include selecting the filter corresponding to the storage pattern of the image buffer from among filters of different patterns and applying the selected filter to the image data stored in the image buffer.

The generating of the image-processed data may include generating, as the image-processed data, convolution-processed image data by applying a convolution filter for convolution processing to the image data stored in the image buffer.

The generating of the image-processed data may include generating a line of a result image by applying a convolution filter to the image data stored in the image buffer, in response to a line of the acquired image data being input and stored in the image buffer.

The image data may include pixels of a plurality of color components arranged in a pattern, and the generating may include generating the image-processed data by applying a filter corresponding to the pattern to the image data stored in the image buffer.

The generating may include applying a first filter corresponding to an arrangement pattern of first color components in the pattern to the image data stored in the image buffer, and applying a second filter corresponding to an arrangement pattern of second color components in the pattern to the image data stored in the image buffer.

In another general aspect, there is provided an sensor device including an image sensor configured to acquire image data, an image buffer configured to sequentially stores the image data in a unit of lines, and an image processor configured to process the stored image data by applying a filter corresponding to a storage pattern of a line of image data most recently stored in the image buffer.

Other features and aspects will be apparent from the following detailed description, the drawings, and the claims.

Figure 1:
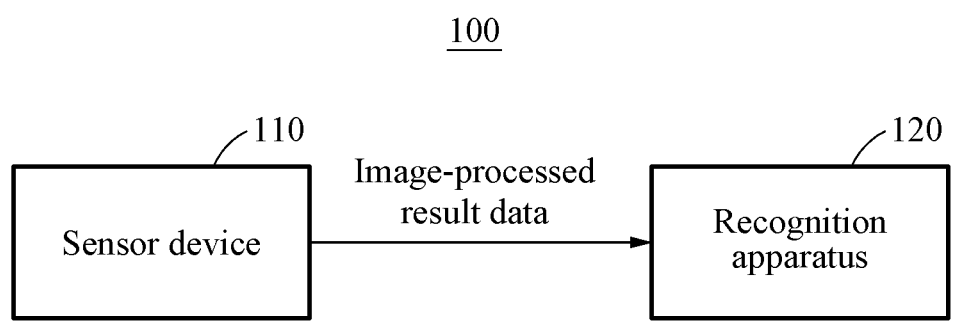
FIG. 1 illustrates an example of an overall configuration of a recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, examples will be further described with reference to the accompanying drawings. The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Terms, such as first, second, and the like, may be used herein to describe components. Each of these terminologies is not used to define an essence, order or sequence of a corresponding component but used merely to distinguish the corresponding component from other component(s). It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, examples will be described in detail with reference to the accompanying drawings. When describing the examples with reference to the accompanying drawings, like reference numerals refer to like constituent elements and a repeated description related thereto will be omitted.

FIG. 1 illustrates an example of an overall configuration of a recognition system.

Referring to FIG. 1, a recognition system 100 includes a sensor device 110 and a recognition apparatus 120. The recognition system 100 acquires image data through the sensor device 110 and recognizes an object shown in the image data through the recognition apparatus 120. The recognition system 100 is used for object recognition such as face recognition or recognition of things.

The sensor device 110 acquires the image data using an image sensor such as a camera and generates image-processed result data by performing image processing on the acquired image data. The sensor device 110 generates convolution-processed result data by performing convolution processing on the acquired image data. The sensor device 110 performs convolution processing by applying a filter for performing a convolution operation to the image data. If the image data acquired by the image sensor is image data of a Bayer pattern, the sensor device 110 generates convolution-processed result data by performing convolution processing even with respect to the image data of the Bayer pattern. As described above, convolution processing of the image data is performed in the sensor device 110. Herein, the term "filter" is used interchangeably with the term mask, kernel, or template.

In another example, the sensor device 110 compresses the convolution-processed image data. For example, the sensor device 110 generates quantized image data as the result data by quantizing the convolution-processed image data. The quantized image data is image data having fewer bits than the original image data acquired by the image sensor, for example, binary image data in which each of all the pixels of the image data has one of a first pixel value (for example, "0") and a second pixel value (for example, "1").

In an example, the sensor device 110 autonomously performs image processing such as convolution processing and/or quantization using an internal processing unit, for example, an image processor or a micro controller unit. The image-processed result data is transmitted to the recognition apparatus 120. Herein, the image processor refers to a processor that performs a function to process image data in the sensor device 110, and should not be interpreted as limiting to a processor that performs only the function to process images. In an example, the image processor performs a function other than image processing, such as, for example, controlling the sensor device 110.

As described above, image processing is first performed with respect to the image data acquired by the sensor device 110 in the sensor device 110 rather than the recognition apparatus 120. For example, the sensor device 110 performs convolution processing and/or quantization with respect to the image data. In this example, the image-processed result data is transmitted from the sensor device 110 to the outside of the sensor device 110, and thus a bandwidth is required for data transmission as well as a data transmission quantity may be reduced.

The sensor device 110 autonomously performs a processing operation requiring a relatively low computational complexity. For example, the sensor device 110 performs a processing operation such as object detection (for example, face detection) after performing convolution processing and/or quantization on the acquired image data. The sensor device 110 transmits convolution-processed and/or quantized image data to the outside of the sensor device 110 if an object is detected in the image data, and does not transmit the image data to the outside if an object is not detected in the image data. In the present example, only when an object is detected in the image data, the convolution-processed and/or quantized image data is transmitted from the sensor device 110.

The recognition apparatus 120 receives the result data image-processed by the sensor device 110 from the sensor device 110 and performs object recognition based on the received result data. In an example, the recognition apparatus 120 performs object recognition using a trained object recognition model. The object recognition model is, for example, a neural network model, and provides a score (for example, an expected value or a probability value) indicating an object corresponding to an object shown in image data input into the object recognition model based on the image data. The object recognition model is a neural network model having a bit width corresponding to a bit width of the result data received from the sensor device 110. If the result data received from the sensor device 110 is quantized image data having a low bit width, a neural network model having a low bit width corresponding thereto is used, such that the amount of required resources is reduced, and the processing rate increases. By using the object recognition model having a low bit width as described above, the recognition system 100 performs an object recognition process at low power, uses less memory capacity, and high speed in a limited embedded system such as a smart sensor or a smart phone.

Figure 2:
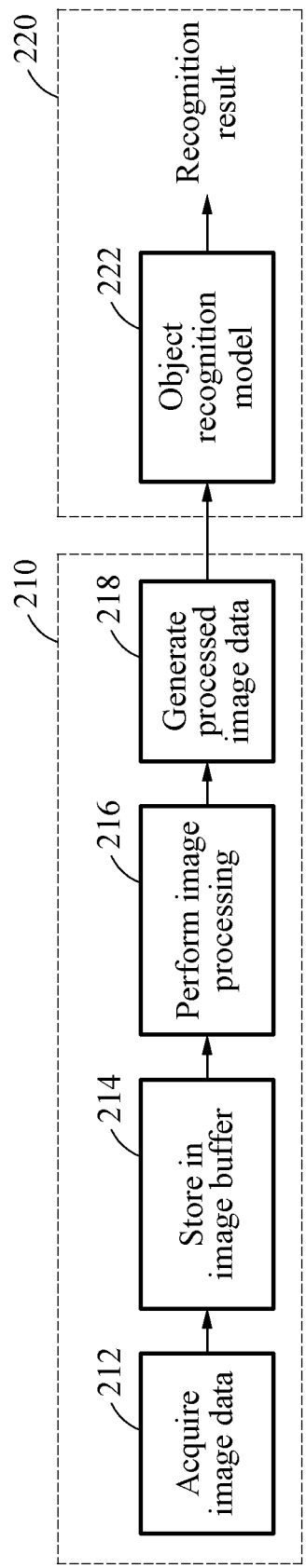
FIG. 2 illustrates an example of an object recognition process.

FIG. 2 illustrates an example of an object recognition process. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. The blocks of the object recognition process of FIG. 2, and combinations of the blocks, are performed by an object recognition apparatus. In an example, the object recognition apparatus is implemented by special purpose hardware-based computer, and devices such as a processor, that perform the specified functions, or combinations of special purpose hardware and computer instructions included in the object recognition apparatus. In addition to the description of FIG. 2 below, the descriptions of FIG. 1 is also applicable to FIG. 2 and are incorporated herein by reference. Thus, the above description may not be repeated here.

Referring to FIG. 2, an object recognition process includes operation 210 in which a sensor device generates image-processed result data by performing image processing on image data, and operation 220 in which a recognition apparatus performs object recognition based on the image-processed result data.

In operation 210, the sensor device acquires image data using an image sensor (in operation 212), and stores the acquired image data in an image buffer in the sensor device (in operation 214). In an example, the image buffer included in the sensor device has a limited capacity and thus, sequentially stores a portion of the image data acquired by the image sensor, rather than storing the entire image data. For example, the image buffer stores only a number of (for example, 5) lines (for example, rows) of image data, from among a plurality of lines constituting the image data, at a point in time. Here, a line refers to a group of pixels arranged in the same horizontal direction or in the same vertical direction, from among pixels included in the image data. In an example, the image buffer stores the image data in the unit of lines, and stores the image data in a manner of sequentially overwriting the image data due to the limited buffer space. For example, assuming that the image buffer stores only five lines of the image data due to a limited buffer area, the most recently received new line of image data is stored in a row where the oldest image data is stored in the buffer area of the image buffer, each time a new line of image data is received by the image buffer. Accordingly, the oldest recorded image data is removed from the buffer area from among the image data stored in the buffer area of the image buffer.

The image data acquired by the image sensor has a pattern (for example, a Bayer pattern) in which pixels of a plurality of color components are arranged, and the image data of the pattern is stored in the image buffer. A general Bayer pattern includes pixel values of different color components, for example, a pixel value of a green component, a pixel value of a blue component, and pixel value of a red component, wherein the pixel value of the blue component and the pixel value of the green component are alternately arranged or the pixel value of the red component and the pixel value of the green component are alternately arranged, depending on a line. However, a Bayer pattern of image data acquirable by the image sensor is not limited to a specific Bayer pattern, and there may be various arrangement patterns of pixel values of color components constituting the image data. For example, the image data has a tetracell pattern in which pixel values of same-color components are set as a single group, or a britecell pattern in which a pixel value of a green component is replaced with a pixel value of a white component in the Bayer pattern. Hereinafter, the description will be provided based on a general Bayer pattern for ease of description. However, a pattern of image data acquirable by the image sensor is not limited to the general Bayer pattern, and there may be unlimited types of patterns.

In operation 216, the sensor device performs image processing with respect to the image data stored in the image buffer, and in operation 218, the sensor device generates the image-processed image data as result data. The sensor device performs image processing such as convolution processing using a pattern corresponding to a storage pattern of the image buffer depending on a point in time at which the image processing is performed. As described above, the storage pattern of the image data stored in the image buffer changes over time due to sequential storage, and the sensor device performs convolution processing using a filter of a pattern corresponding to the storage pattern of the image data stored in the image buffer, from among a plurality of filters. Thus, the pattern of the filter applied to the image data in the image buffer changes over time as well, and the change in the pattern is repeated with periodicity.

In some examples, quantization may further be performed after convolution processing is performed with respect to the image data. In an example, during the quantization, the sensor device quantizes the image data using the halftone technique. The halftone technique is a technique that converts image data having a high bit width to image data (for example, binary image data) having a low bit width, wherein pixel values of an image are expressed as a density on a two-dimensional space. For example, the sensor device quantizes the image data by applying a quantization filter such as a dither matrix to the image data, or quantizes the image data using error diffusion.

The image-processed result data, generated by the sensor device, is transmitted to the recognition apparatus through an output interface of the sensor device. For example, the sensor device transmits the result data to the recognition apparatus through an output interface such as a mobile industry processor interface (MIPI). The number of lines of the result data transmitted from the sensor device to the recognition apparatus is determined based on the MIPI standards. The recognition apparatus includes, for example, an application processor (AP) connected to the MIPI.

In operation 220, the recognition apparatus performs object recognition using an object recognition model 222. The object recognition model 222 is, for example, a trained neural network model, and provides a recognition result with respect to the object recognition based on the image-processed result data received from the sensor device. The object recognition process is performed under the control of a processor, which may be a hardware-implemented data processing device having a circuit that is physically structured to execute desired operations, such as a central processing unit (CPU), a graphics processing unit (GPU), or a neural processing unit (NPU), included in the recognition apparatus. If the image data is input into the object recognition model 222, the object recognition model 222 outputs a score indicating a probability or possibility that an object shown in the image data corresponds to each class (or label). The recognition apparatus determines an object recognition result based on information about the score.

Figure 3:
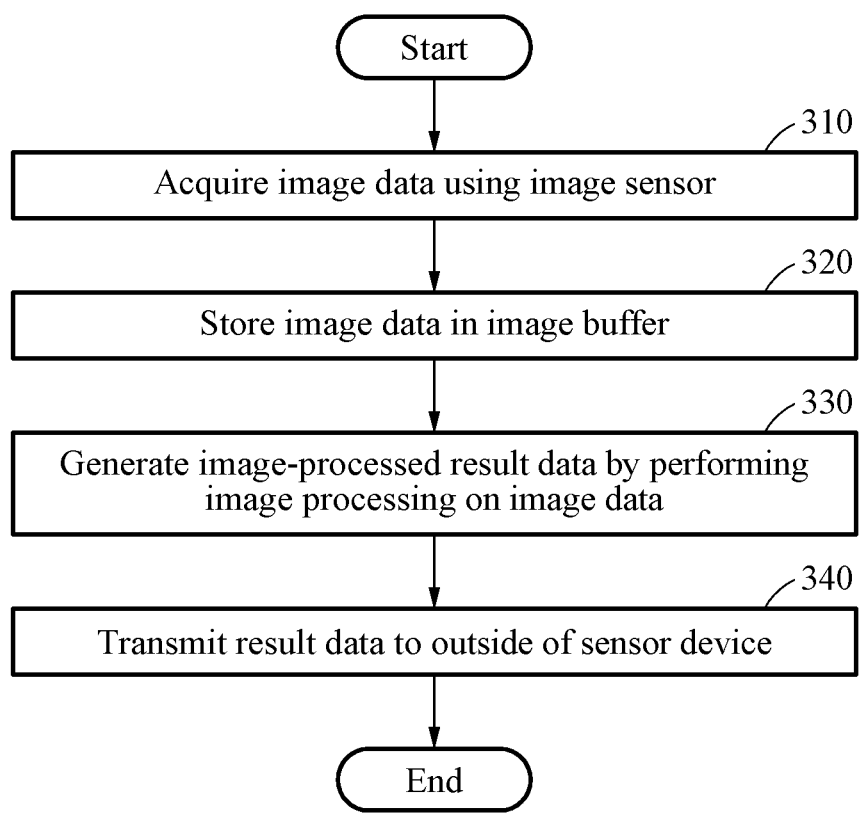
FIG. 3 illustrates an example of operations of an image data processing method performed by a sensor device.

FIG. 3 illustrates an example of operations of an image data processing method performed by a sensor device. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. The blocks of the image data processing method of FIG. 3, and combinations of the blocks, are performed by special purpose hardware-based computer, and devices such as a processor, that perform the specified functions, or combinations of special purpose hardware and computer instructions included in the sensor device. In addition to the description of FIG. 3 below, the descriptions of FIG. 1-2 is also applicable to FIG. 3 and are incorporated herein by reference. Thus, the above description may not be repeated here.

Referring to FIG. 3, in operation 310, a sensor device acquires image data using an image sensor such as a camera. In operation 320, the sensor device stores the acquired image data in an image buffer. The sensor device sequentially stores a portion of the image data in the unit of lines due to a limited buffer area of the image buffer. In another example, the image sensor acquires image data of a Bayer pattern, and the image data of the Bayer pattern is stored in the image buffer.

In operation 330, the sensor device generates image-processed result data by performing image processing on the image data stored in the image buffer. The sensor device generates the image-processed result data by applying a filter corresponding to a current storage pattern of the image buffer to the image data stored in the image buffer. For example, the sensor device generates, as the result data, convolution-processed image data by applying a convolution filter for convolution processing to the image data stored in the image buffer. When a line of the image data acquired by the image sensor is input and stored in the image buffer, the sensor device outputs a line of a result image by performing convolution processing by applying the convolution filter to the image data stored in the image buffer. The convolution filter includes coefficients or weights to be applied to the image data, and pixel values of the result image are determined based on pixel values of the image data stored in the image buffer by the convolution processing using the convolution filter. As described above, the convolution processing with respect to the image data stored in the image buffer is performed in the sensor device.

The sensor device selects the filter corresponding to the current storage pattern of the image buffer from among filters of different patterns and applies the selected filter to the image data stored in the image buffer. In an example, the number of filters of different patterns is determined based on the number of lines of image data that can be stored in the image buffer and the size of the filters. For example, if the image buffer is able to store five rows of the image data in relation to the buffer size of the image buffer and the size of the filter is 5×5, there may be five filters of different patterns.

The sensor device selects a filter of a pattern to be applied to image data currently stored in the image buffer from among filters of a plurality of patterns, based on a buffer area in which the image data has been most recently stored in the image buffer. A filter to be used for image processing is determined from among the filters of several patterns, based on the most recently changed line from among the lines included in the buffer area of the image buffer.

The image processing process using the filter starts when the image data is stored in the entire buffer area of the image buffer or when the image data is stored in a portion of the entire buffer area. If the image data is stored in a portion of the entire buffer area, zero-padding that performs image processing by filling a portion required for image processing with a value of "0" or wrap-around that processes the image data as if the start portion and the end portion of the image data are connected to each other is used for image processing.

If the image data stored in the image buffer is image data of a pattern in which pixels of a plurality of color components are arranged, for example, a Bayer pattern, the sensor device generates the image-processed result data by applying a filter corresponding to an arrangement pattern of the color components in the Bayer pattern of the image data stored in the image buffer to the image data stored in the image buffer. For example, at a first point in time with respect to the image data stored in the image buffer, the sensor device applies a first filter corresponding to an arrangement pattern of first color components (for example, blue components) in the Bayer pattern to the image data stored in the image buffer, and applies a second filter corresponding to an arrangement pattern of second color components (for example, green components) that are different from the first color components to the image data stored in the image buffer. The first filter and the second filter are alternately applied to pixels of the image data stored in the image buffer. For example, at a second point in time with respect to the image data stored in the image buffer, the sensor device applies the second filter corresponding to the arrangement pattern of the second color components (for example, green components) in the Bayer pattern to the image data stored in the image buffer, and applies a third filter corresponding to an arrangement pattern of third color components (for example, red components) that are different from the second color components to the image data stored in the image buffer. The second filter and the third filter are also alternately applied to pixels of the image data stored in the image buffer.

In some examples, the sensor device generates result data having a low bit width by performing quantization after the convolution processing. The sensor device generates quantized image data by applying a quantization filter to the image data on which the convolution processing is performed. The image data acquired by the image sensor has a great number of bits. The sensor device reduces the number of bits of the image data corresponding to the result data by autonomously performing quantization through a processing unit, such as an image processor or a micro controller unit, included in the sensor device.

In operation 340, the sensor device transmits the image-processed result data to the outside of the sensor device. The sensor device transmits the result data to the outside of the sensor device through an output interface such as, for example, MIPI. As described above, the image data acquired through the image sensor is output from the sensor device after image-processed in the sensor device.

Figure 4:
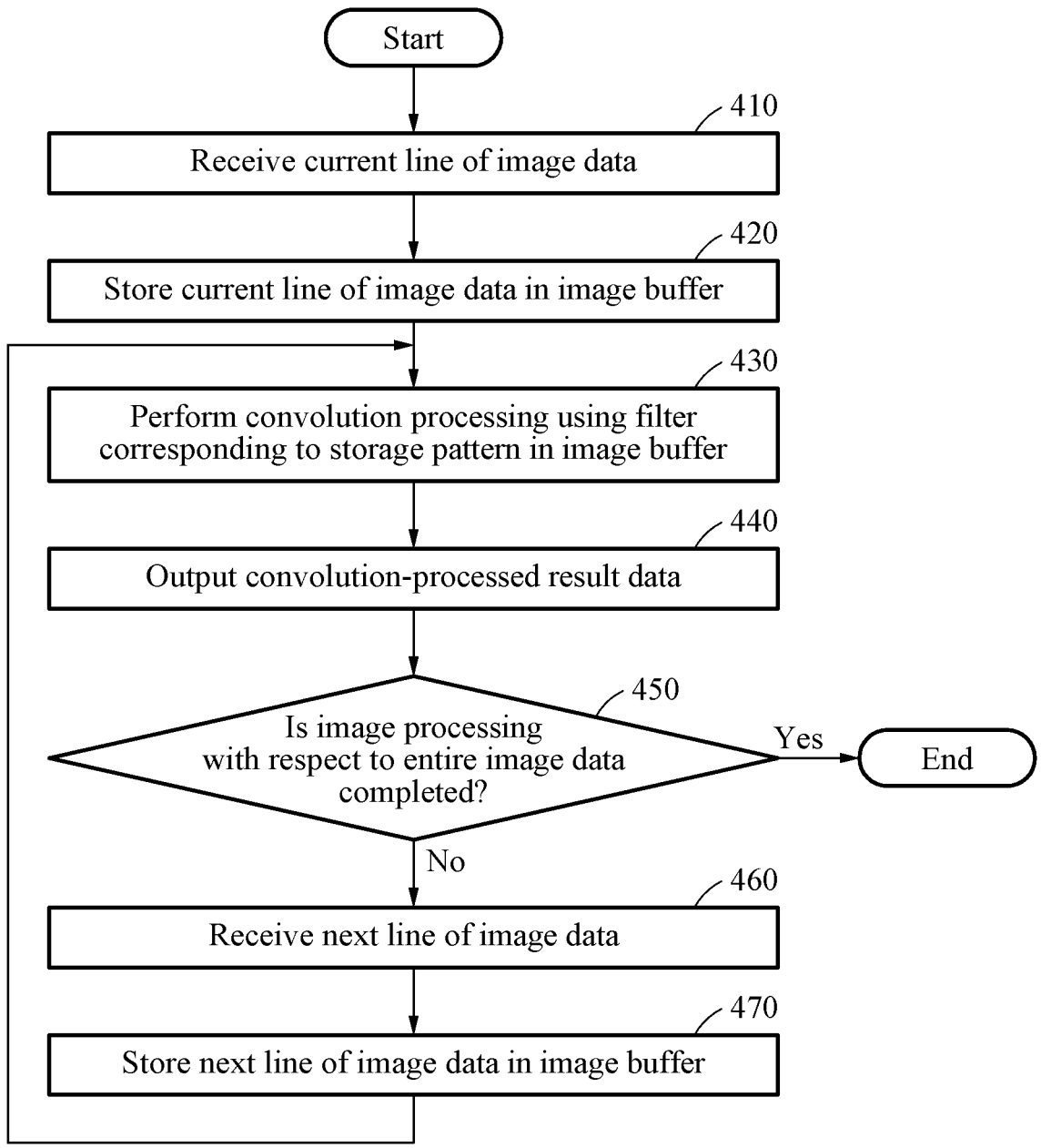
FIG. 4 illustrates an example of a convolution processing process.

FIG. 4 illustrates an example of a convolution processing process. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. The blocks of the convolution processing process of FIG. 4, and combinations of the blocks, are performed by special purpose hardware-based computer, and devices such as a processor, that perform the specified functions, or combinations of special purpose hardware and computer instructions included in a convolution processing device. In addition to the description of FIG. 4 below, the descriptions of FIG. 1-3 is also applicable to FIG. 4 and are incorporated herein by reference. Thus, the above description may not be repeated here.

Referring to FIG. 4, in operation 410, a current line of image data is received by an image buffer. In operation 420, the sensor device stores the received current line of the image data in the image buffer. For example, the sensor device records the current line of the image data in a buffer area in which the oldest image data is recorded, in the buffer area of the image buffer. Here, the buffer area in which the image data is recorded is defined in the unit of lines.

In operation 430, the sensor device performs convolution processing using a filter corresponding to a storage pattern of the image data in the image buffer. For example, the sensor device performs image processing using a convolution filter corresponding to a storage pattern of image data currently stored in the image buffer, from among convolution filters of predefined patterns. Here, the storage pattern of the image data changes, for example, depending on a line in which the image data is most recently stored, among the lines included in the buffer area of the image buffer.

In operation 440, the sensor device outputs the convolution-processed result data. The sensor device outputs a line of the result image as the result data through convolution processing by applying the convolution filter to the image data stored in the image buffer.

In operation 450, the sensor device determines whether image processing with respect to the entire image data is completed. The sensor device determines whether the last line of the image data acquired by the image sensor is transmitted and stored in the image buffer and convolution processing with respect to the last line of the image data is all completed. If the image processing with respect to the entire image data is all completed by completing image processing with respect to the last line of the image data, the convolution processing process is terminated.

If image processing with respect to the entire image data is yet to be completed, in operation 460, a next line of the image data is received by the image buffer. In an example, the next line of the image data is a row immediately after the current line of the image data received in operation 410, in the image data acquired by the image sensor. In operation 470, the sensor device stores the received next line of the image data in the image buffer. The sensor device records the next line of the image data in a buffer area in which the oldest image data is recorded, in the buffer area of the image buffer. The sensor device performs the image processing process again, starting from operation 430.

As described above, the sensor device sequentially stores, in the image buffer, the image data acquired by the image sensor in the unit of lines, and performs convolution processing using a filter corresponding to a storage pattern of the image data stored in the image buffer, such that the convolution processing is effectively performed in the sensor device, irrespective of the limited buffer area of the image buffer.

Figure 5:
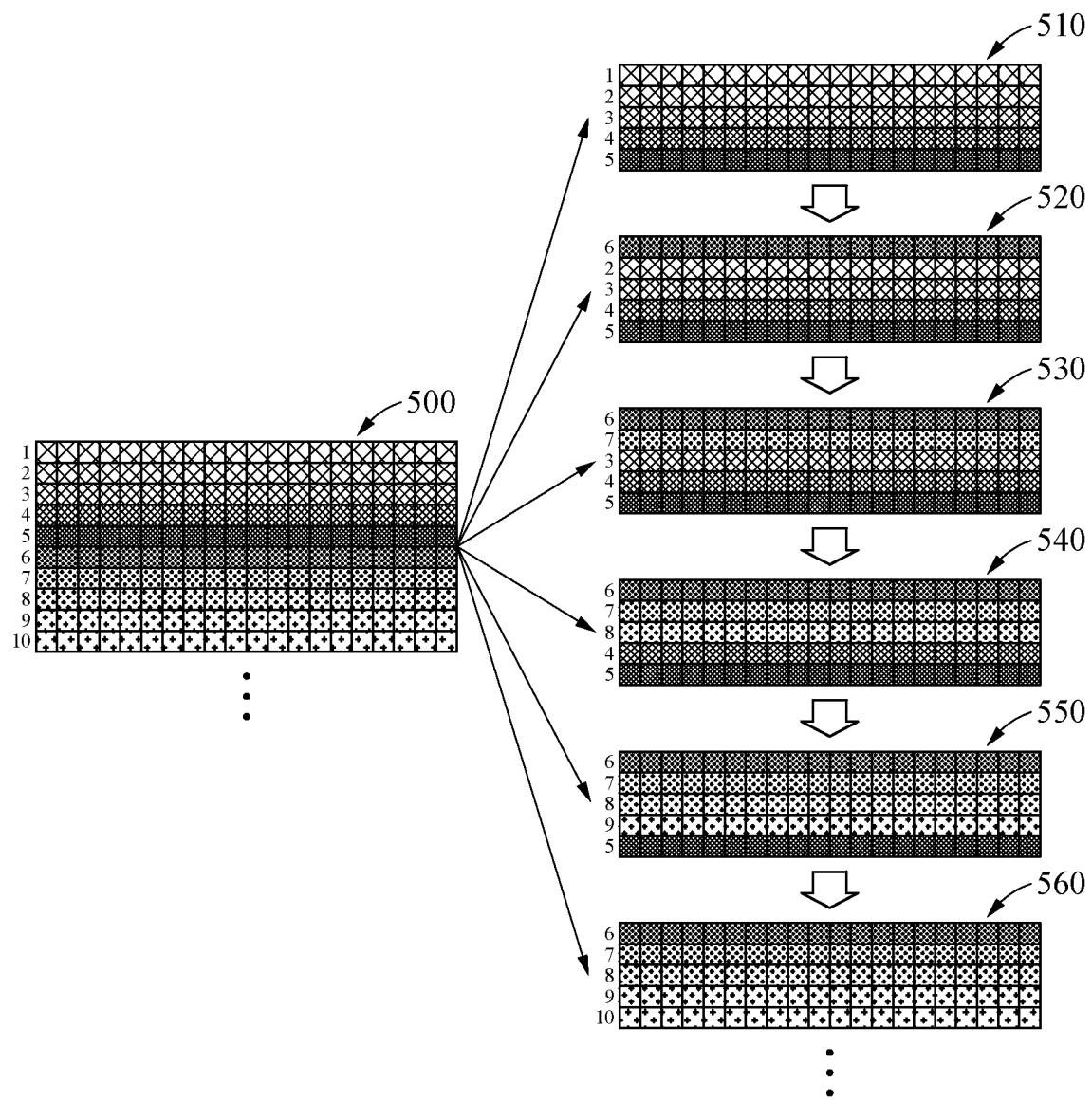
FIGS. 5 and 6 illustrate an example of performing convolution processing with respect to image data.
Figure 6:
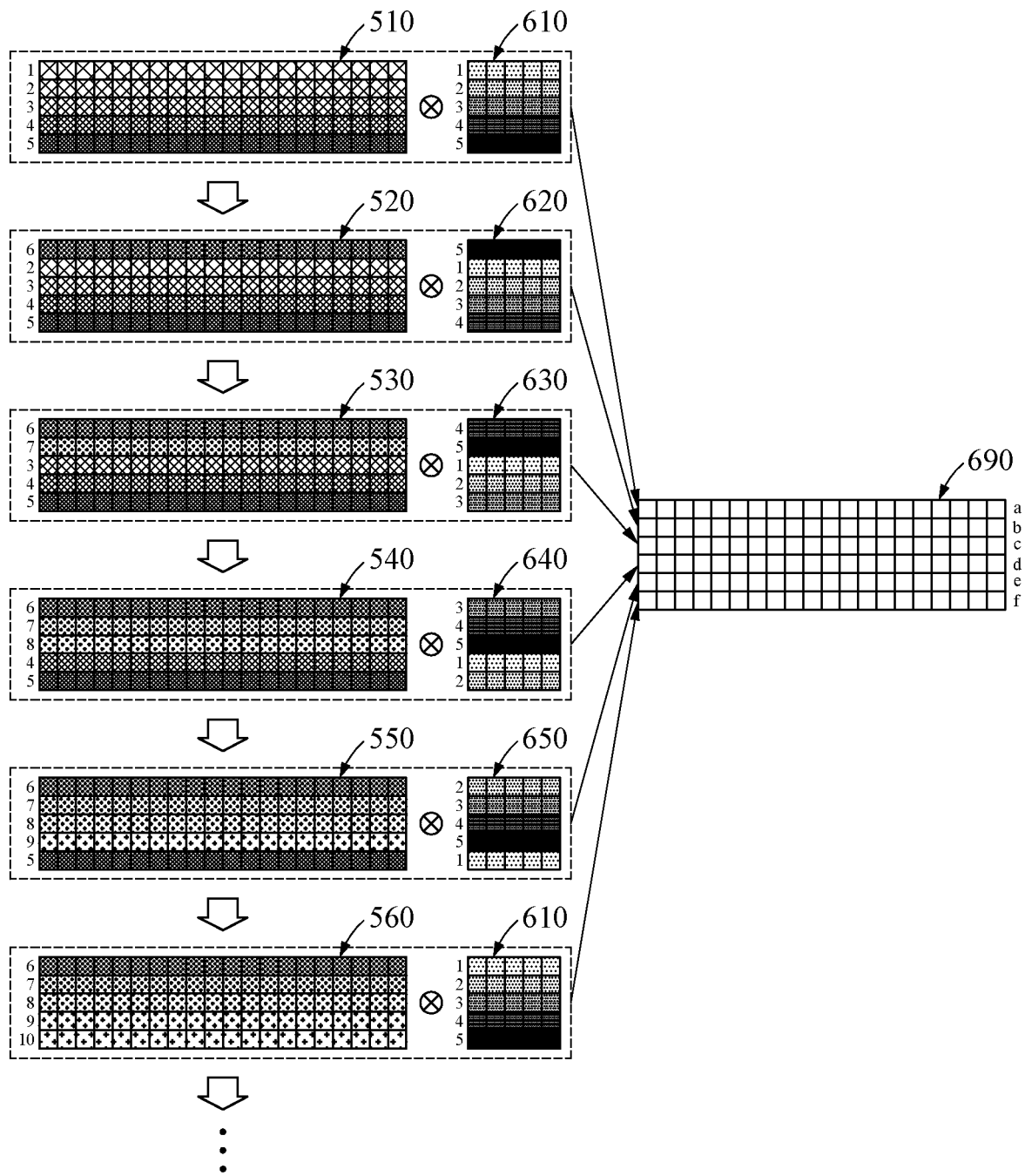

FIGS. 5 and 6 illustrate an example of performing convolution processing with respect to image data.

FIG. 5 illustrates that image data 500 is acquired by an image sensor of a sensor device. The image data 500 includes multiple lines 1, 2, 3, . . . each being a set of pixels. For example, a line "1" of the image data 500 is a set of pixels corresponding to a first row, and a line "2" of the image data 500 is a set of pixels corresponding to a second row. The image data 500 is stored in an image buffer included in the sensor device. In the present example, it is assumed that a buffer area of the image buffer only stores five rows of image data. However, the size of the buffer area of the image buffer is not limited thereto.

Similar to rolling shutter, the image buffer sequentially stores the image data 500 line by line. For example, the image buffer sequentially stores lines "1" to "5" of the image data 500, as shown in a storage pattern 510. Due to a limited buffer area, the image buffer stores the received image data in a manner of overwriting. For example, if a line "6" of the image data 500 is received in a storage state of the image buffer shown in the storage pattern 510, the image buffer stores the line "6" of the image data by overwriting the line "6" of the image data to the oldest recorded buffer area (the buffer area in which the line "1" of the image data is recorded), as shown in a storage pattern 520. After that, if a line "7" of the image data 500 is received, the image buffer records the line "7" of the image data to the oldest recorded buffer area (the buffer area in which the line "2" of the image data is recorded), as shown in a storage pattern 530. In this manner, the storage pattern of the image data stored in the image buffer is represented sequentially in an order of the storage pattern 510, the storage pattern 520, the storage pattern 530, a storage pattern 540, a storage pattern 550, a storage pattern 560 . . . . As described above, the image data 500 is transmitted to the image buffer line by line, and the image buffer stores a received line of the image data in the buffer area in a manner of overwriting.

Referring to FIG. 6, an example of performing convolution processing with respect to each storage pattern of an image buffer is illustrated. As a storage pattern of the image buffer changes, a pattern of a filter for convolution processing also changes according to the storage pattern of the image buffer. A sensor device selects a filter corresponding to a current storage pattern of the image buffer from among filters of different patterns 610, 620, 630, 640, and 650, and applies the selected filter to the image data stored in the image buffer.

For example, a filter of a pattern 610 is applied to the image data in correspondence to the storage pattern 510 of the image data in the image buffer, and a filter of a storage pattern 620 is applied in correspondence to the storage pattern 520 of the image data in the image buffer. In the case of the storage pattern 510, the filter of the pattern 610 which is a basic pattern is directly applied. However, in the case of the storage pattern 520, the filter of the pattern 610 which is a basic pattern should not be directly applied since an order of rows of the image data stored in the image buffer is not in sequence. Accordingly, the sensor device rotates the components of the filter to corresponds to the order of the storage pattern 520, as shown in the pattern 620, and uses the filter of the pattern 620 in which the components are arranged in an order of "5, 1, 2, 3, 4". Data (convolution-processed pixels values) corresponding to a line "a" of result data 690 is determined by applying the filter of the pattern 610 to the image data of the storage pattern 510, and data corresponding to a line "b" of the result data 690 is determined by applying the filter of the pattern 620 to the image data of the storage pattern 520.

Further, the filter of the pattern 630, the filter of the pattern 640, and the filter of the pattern 650 are applied respectively in correspondence to the storage pattern 530, the storage pattern 540, and the storage pattern 550. If a line "7" of the image data is stored in the image buffer as shown in the storage pattern 530, the order of the image data stored in the image buffer is "6, 7, 3, 4, 5". In this example, the sensor device uses the filter of the pattern 630 with a component order of "4, 5, 1, 2, 3" corresponding to the order of the storage pattern 530.

In the case of the storage pattern 560, data corresponding to a line "f" of the result data 690 is determined by applying the filter of the storage pattern 610 again. The pattern of the filter applied to the image buffer is changed repeatedly from the pattern 610 to the pattern 650 as one cycle. A filter with a pattern changed repeatedly with periodicity as described above will be referred to as a "rotational filter". Each time image data is input into the image buffer, the pattern of the filter used for convolution processing is rotated. The number of different patterns of filters corresponds to the number of lines of the image data that may be stored in the image buffer. For example, assuming that the number of lines of image data that can be stored in the image buffer is "5", there are five filters of different patterns. The sensor device obtains the convolution-processed result data 690 by sequentially applying a filter corresponding to a storage pattern of the image buffer each time a new line of image data is input into the image buffer.

Figure 7A:
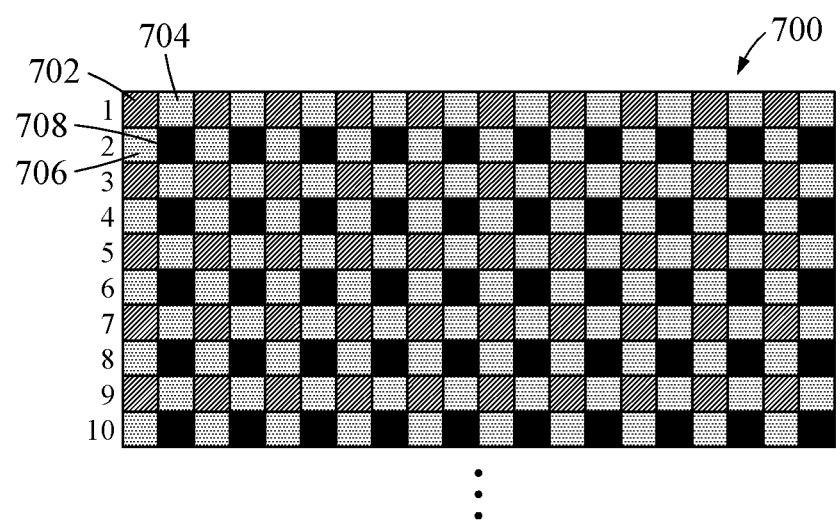
FIGS. 7A through 8 illustrate an example of performing convolution processing with respect to image data of a Bayer pattern.
Figure 7B:
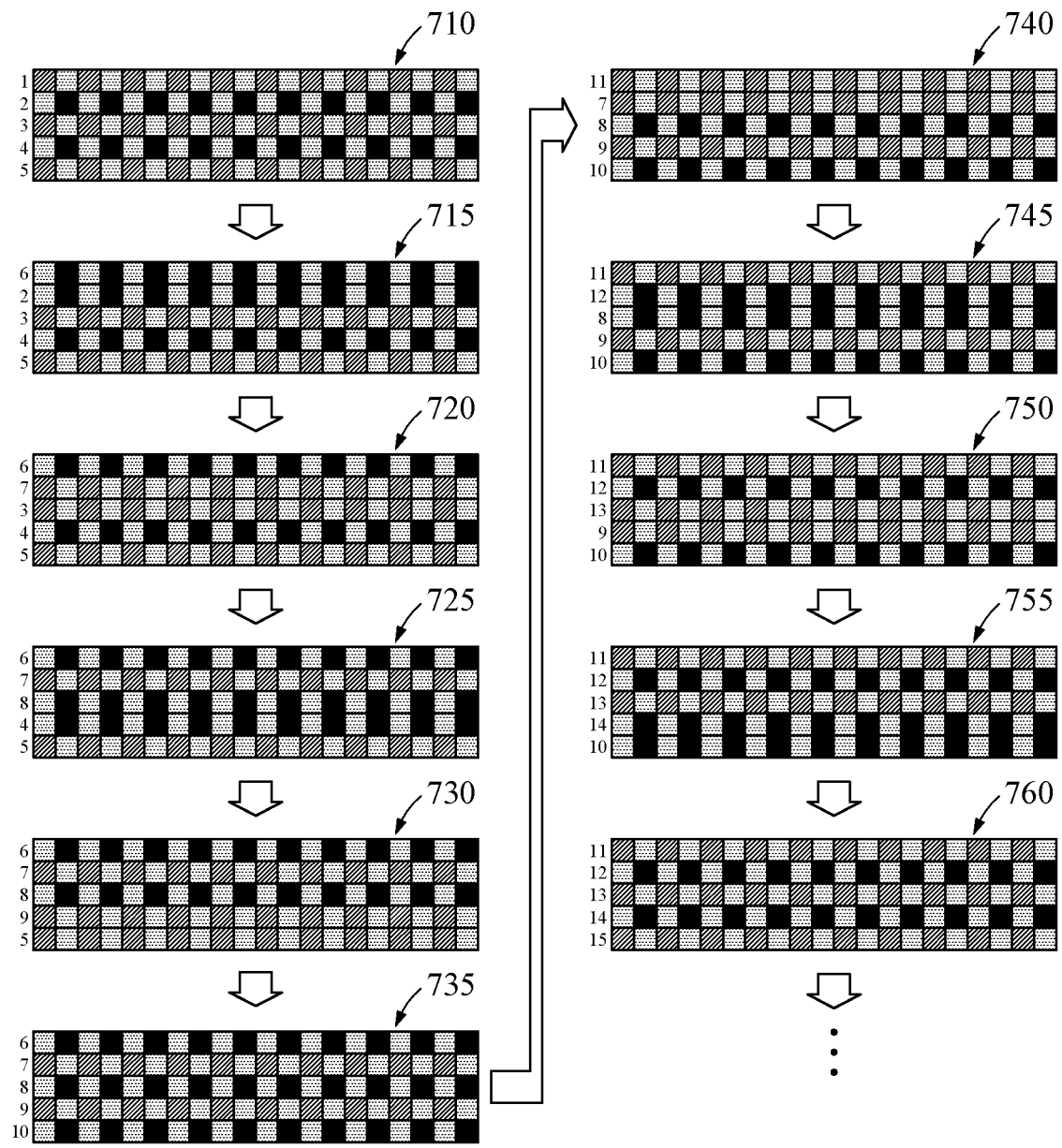
Figure 8:
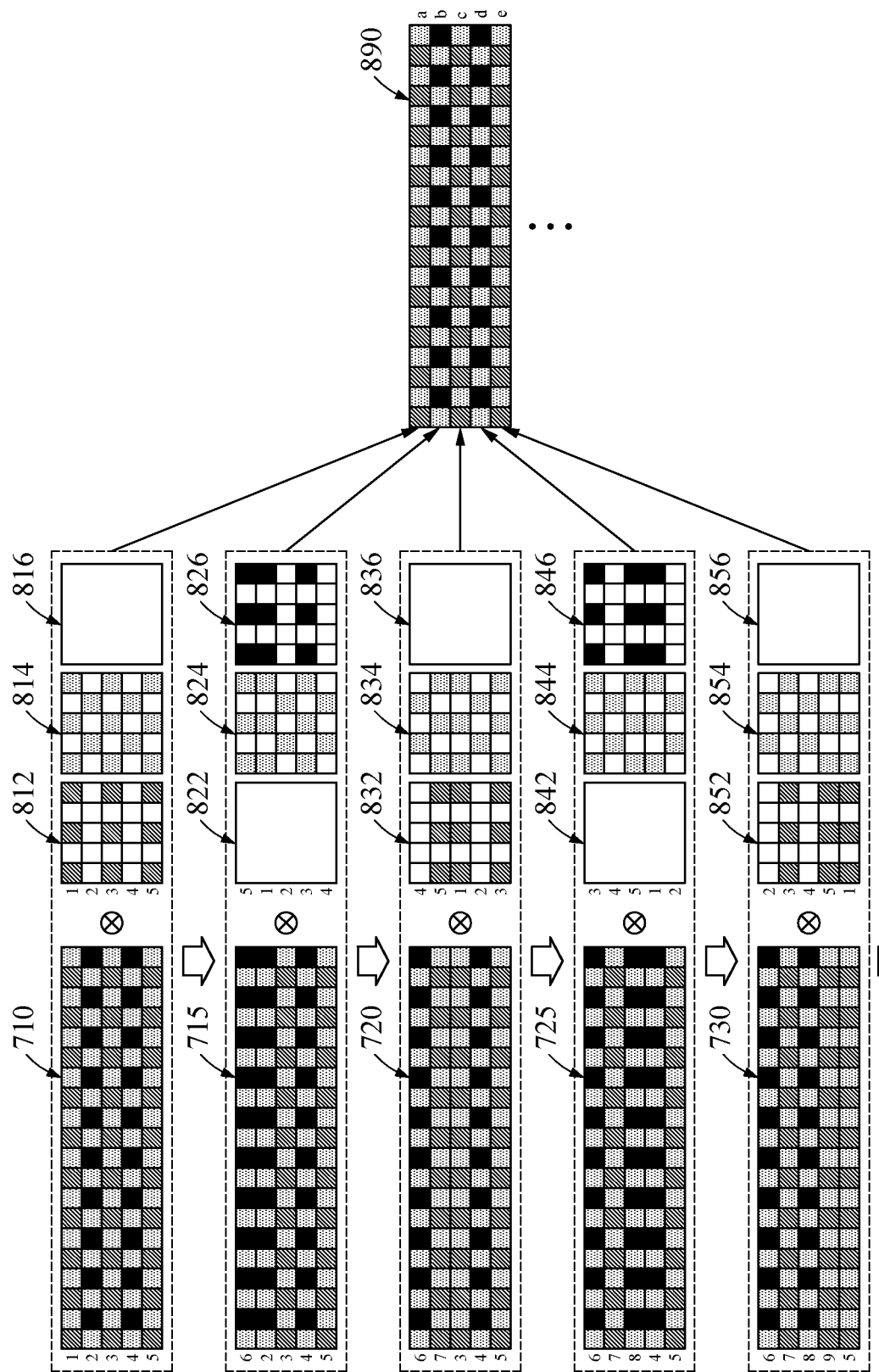

FIGS. 7A through 8 illustrate an example of performing convolution processing with respect to image data of a Bayer pattern.

Referring to FIG. 7A, an example of image data 700 of a Bayer pattern acquired by an image sensor is illustrated. The image data 700 of the Bayer pattern is expressed in the formed in which a pixel value of a Blue component 702, pixel values of green components 704 and 706, and pixel values of red component 708 are arranged. A color component corresponding to each pixel of the image data 700 is predefined. For example, odd-numbered lines of the image data 700 include the pixel value of the blue component 702 and the pixel value of the green component 704 that are alternately arranged, and even-numbered lines of the image data 700 include the pixel value of the green component 706 and the pixel value of the red component 708 that are alternately arranged. However, the Bayer pattern is not limited to the present example, and may have various forms.

FIG. 7B illustrates an example of storing the image data 700 of the Bayer pattern of FIG. 7A. Referring to FIG. 7B, the image data 700 is stored sequentially in a buffer area of the image buffer in the unit of lines, and thus a storage pattern of the image data stored in the image buffer changes over time.

For example, the image buffer sequentially stores lines "1" to "5" of the image data 700 of the Bayer pattern, as shown in a storage pattern 710. Due to the limited buffer area, the image buffer stores the received image data in a manner of overwriting. For example, if a line "6" of the image data 700 is received in a storage state of the image buffer shown in the storage pattern 710, the image buffer stores the line "6" of the image data by overwriting the line "6" of the image data to the oldest recorded buffer area (the buffer area in which the line "1" of the image data is recorded), as shown in a storage pattern 715. If the image data 700 is stored in the image buffer in this manner, the image data is stored in the image buffer in an order of the storage pattern 710, the storage pattern 715, a storage pattern 720, a storage pattern 725, a storage pattern 730, a storage pattern 735, a storage pattern 740, a storage pattern 745, a storage pattern 750, a storage pattern 755, a storage pattern 760, . . . , as shown in FIG. 7B. The storage pattern 760 shows the same pattern as the storage pattern 710, and the storage pattern 710 to the storage pattern 755 are repeated as from the storage pattern 760.

FIG. 8 illustrates an example of performing convolution processing with respect to image data of a Bayer pattern stored with different patterns in an image buffer. When the image data of the Bayer pattern is stored in the image buffer, the storage pattern of the image buffer changes in an order from the storage pattern 710 to the storage pattern 730. The sensor device generates image-processed result data 890 by applying a filter corresponding to an arrangement pattern of color components in the Bayer pattern of the image data stored in the image buffer to the image data stored in the image buffer. The result data 890 also has the Bayer pattern. The sensor device selects the filter corresponding to the current storage pattern of the image buffer from among filters of predefined patterns and applies the selected filter to the image data stored in the image buffer.

The sensor device applies, to the image data, a filter corresponding to an arrangement pattern of color components in the Bayer pattern of the image data stored in the image buffer. For example, a convolution operation is performed on the image data of the storage pattern 710 by alternately applying a filter 812 corresponding to a blue component and a filter 814 corresponding to a green component (or applying the filter 812 and 814 for every two spaces) thereto, and data (convolution-processed pixel values) corresponding to a line "a" of the result data 890 is determined. Here, a filter 816 corresponding to a red component is not applied. A convolution operation is performed on the image data of the storage pattern 715 by alternately applying a filter 824 corresponding to a green component and a filter 826 corresponding to a red component thereto, and data corresponding to a line "b" of the result data 890 is determined. Here, a filter 822 corresponding to a blue component is not applied. A convolution operation is performed on the image data of the storage pattern 720 by alternately applying a filter 832 corresponding to a blue component and a filter 834 corresponding to a green component thereto, and data corresponding to a line "c" of the result data 890 is determined. Here, a filter 836 corresponding to a red component is not applied. A convolution operation is performed on the image data of the storage pattern 725 by alternately applying a filter 844 corresponding to a green component and a filter 846 corresponding to a red component thereto, and data corresponding to a line "d" of the result data 890 is determined. Here, a filter 842 corresponding to a blue component is not applied. A convolution operation is performed on the image data of the storage pattern 730 by alternately applying a filter 852 corresponding to a blue component and a filter 854 corresponding to a green component thereto, and data corresponding to a line "e" of the result data 890 is determined. Here, a filter 856 corresponding to a red component is not applied.

As described above, the sensor device obtains the result data 890 by sequentially applying filters of patterns corresponding to the Bayer pattern of the image data stored in the image buffer each time a new line of the image data is input and stored in the image buffer. In this example, the sensor device performs a convolution operation for each color component, but does not apply a filter for a convolution operation to a color component not included in a row of the output data 890.

Figure 9:
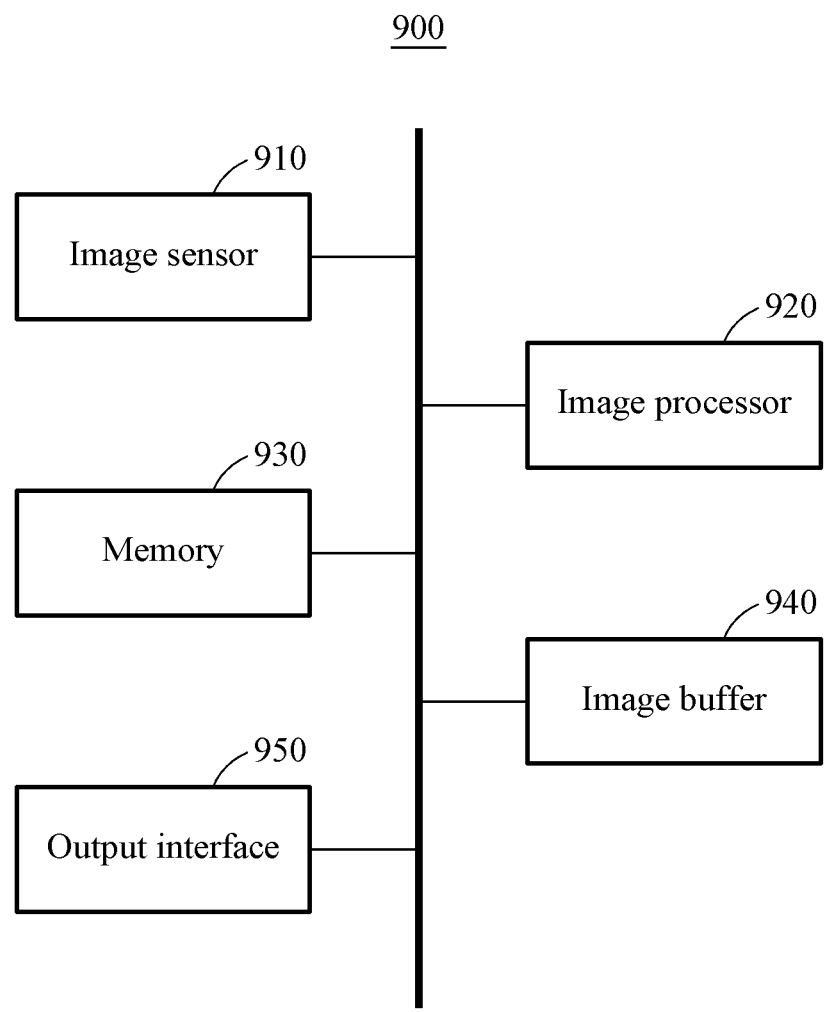
FIG. 9 illustrates an example of a configuration of a sensor device.

FIG. 9 illustrates an example of a configuration of a sensor device.

Referring to FIG. 9, a sensor device 900 includes an image sensor 910, an image processor 920, a memory 930, an image buffer 940, and an output interface 950. The sensor device 900 corresponds to the sensor device described herein.

The image sensor 910 acquires image data. For example, the image sensor 910 acquires image data such as a color image, a gray-scale image, or an infrared image. The image buffer 940 stores the image data acquired by the image sensor 910. The image buffer 940 sequentially stores a portion of the image data in the unit of lines.

The image processor 920 controls an operation of the sensor device 900 and includes, for example, any one or any combination of a digital signal processor (DSP), an image signal processor (ISP), and a micro controller unit (MCU).

The image processor 920 performs image processing such as convolution processing and/or quantization with respect to the image data stored in the image buffer 940. The image processor 920 performs one or more operations related to the image processing described above with reference to FIGS. 1 to 8.

For example, the image processor 920 generates convolution-processed result data by applying a convolution filter corresponding to a current storage pattern of the image buffer 940 to the image data stored in the image buffer. If the image data stored in the image buffer is image data of a Bayer pattern, the image processor 920 generates image-processed result data by applying a filter corresponding to an arrangement pattern of color components in the Bayer pattern of the image data stored in the image buffer to the image data stored in the image buffer. In another example, the image processor 920 generates quantized image data as result data by performing quantization with respect to the convolution-processed image data.

The memory 930 stores instructions to be executed by the processor 920 and information to be used to perform image processing. The memory 930 stores the image data acquired by the image sensor 910 and the image-processed result data. The memory 930 includes, for example, a high-speed random-access memory and/or a non-volatile computer-readable storage medium. Further details regarding the memory 930 is provided below.

The output interface 950 transmits the result data image-processed by the image processor 920 to the outside of the sensor device 900. The output interface 950 transmits the result data to a recognition apparatus through wired or wireless communication. For example, the output interface 950 is an MIPI. In this example, the sensor device 900 transmits the result data with a bandwidth determined by the MIPI standard.

Figure 10:
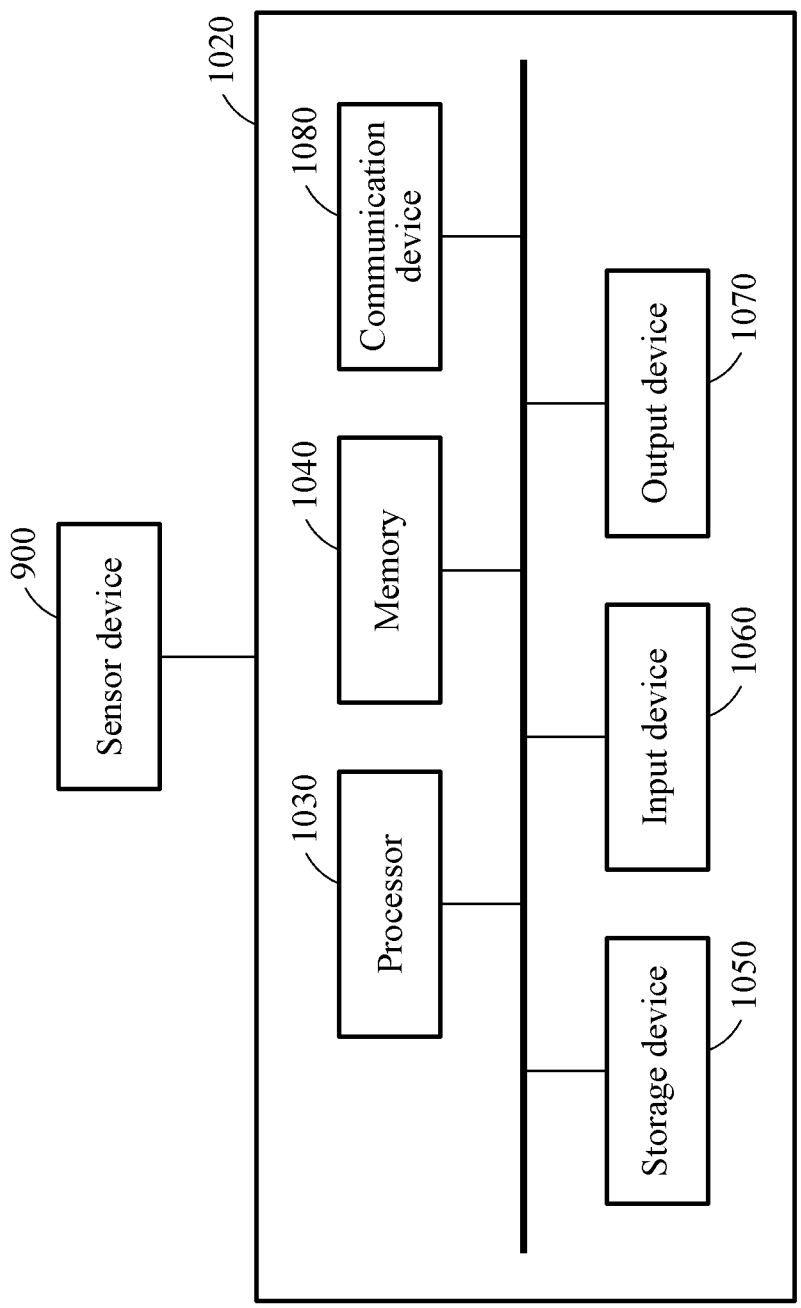
FIG. 10 illustrates an example of a configuration of a recognition apparatus.

FIG. 10 illustrates an example of a configuration of a recognition apparatus.

Referring to FIG. 10, a recognition apparatus 1020 includes a processor 1030, a memory 1040, a storage device 1050, an input device 1060, an output device 1070, and a communication device 1080. The elements of the recognition apparatus 1020 communicate with each other through a communication bus. The recognition apparatus 1020 corresponds to the recognition apparatus described herein.

The processor 1030 controls an operation of the recognition apparatus 1020 and executes instructions and functions to perform object recognition. For example, the processor 1030 executes instructions stored in the memory 1040 or the storage device 1050. The processor 1030 includes, for example, any one or any combination of a CPU, a GPU, and an NPU, and performs one or more of the operations related to object recognition described with reference to FIGS. 1 through 9. For example, the processor 1030 performs object recognition based on image-processed result data received from the sensor device 900.

The memory 1040 stores instructions to be executed by the processor 1030 and information to be used to perform object recognition. The memory 1040 includes, for example, a high-speed random-access memory and/or a non-volatile computer-readable storage medium. Further details regarding the memory 1040 is provided below.

The storage device 1050 includes a computer-readable storage medium. The storage device 1050 stores a greater quantity of information than the memory 1040 and for a longer time. For example, the storage device 1050 includes storage mediums such as, for example, a hard disk, an optical disk, and a solid-state drive.

The input device 1060 receives an input from a user through a tactile, video, audio, or touch input. For example, the input device 1060 includes a keyboard, a mouse, a touch screen, a microphone, or any other device that detects the input from the user and transmits the detected input to the recognition apparatus 1020.

The output device 1070 provides an output of the recognition apparatus 1020 to the user through a visual, auditory, or tactile channel. The output device 1070 includes, for example, a display, a touch screen, a speaker, a vibration generator, or any other device that provides the output to the user.

The communication device 1080 communicates with an external device through a wired or wireless network. For example, the communication device 1080 receives image-processed result data from the sensor device 900 through an MIPI.

The apparatuses, units, modules, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing. One or more processors may include hardware, such as, for example, a processor, a controller and an arithmetic logic unit (ALU), a DSP, a microcomputer, an FPGA, a programmable logic unit (PLU), a microprocessor or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the image data processing method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor device comprising:
   an image sensor configured to acquire image data;
   an image buffer configured to store the image data; and
   an image processor configured to generate image-processed data by applying a filter, selected from among filters each having a different filter pattern, corresponding to a storage pattern of the image buffer to the image data stored in the image buffer,
   wherein a number of the filters is determined based on a number of lines of image data that can be stored in the image buffer and a size of the filters.

2. The sensor device of claim 1, wherein the image processor is further configured to select the filter corresponding to the storage pattern of the image buffer from among the filters of different filter patterns and to apply the selected filter to the image data stored in the image buffer.

3. The sensor device of claim 1, wherein the image processor is further configured to select a filter of a pattern for image data currently stored in the image buffer from among the filters of a plurality of different filter patterns, based on a buffer area in which the image data has been most recently stored in the image buffer.

4. The sensor device of claim 1, wherein the image processor is further configured to generate, as the image-processed data, convolution-processed image data by applying a convolution filter for convolution processing to the image data stored in the image buffer.

5. The sensor device of claim 4, wherein convolution processing with respect to the image data stored in the image buffer is performed in the sensor device.

6. The sensor device of claim 1, wherein the image processor is further configured to output a line of a result image by applying a convolution filter to the image data stored in the image buffer, in response to a line of the image data being input and stored in the image buffer.

7. The sensor device of claim 1, wherein the image buffer is further configured to store the image data comprising pixels of a plurality of color components arranged in a pattern, and
   the image processor is further configured to generate the image-processed data by applying a filter corresponding to the pattern to the image data stored in the image buffer.

8. The sensor device of claim 7, wherein the image processor is further configured to:
   apply a first filter corresponding to an arrangement pattern of first color components in the pattern to the image data stored in the image buffer, and
   apply a second filter corresponding to an arrangement pattern of second color components in the pattern to the image data stored in the image buffer.

9. The sensor device of claim 8, wherein the first color components and the second color components are different color components, and
   the first filter and the second filter are alternately applied to pixels of the image data stored in the image buffer.

10. The sensor device of claim 1, wherein the image buffer is further configured to sequentially store a portion of the image data acquired by the image sensor in a unit of lines.

11. The sensor device of claim 10, wherein the image buffer is further configured to sequentially overwrite a line of the image data.

12. The sensor device of claim 10, wherein the image processor is further configured to select a filter for image data currently stored in the image buffer from among the filters of a plurality of different filter patterns, based on a recently changed line of image data in the image buffer.

13. The sensor device of claim 1, wherein the image processor is further configured to apply the filter to the image data stored in the image buffer and to generate quantized image data by quantizing the filter-applied image data.

14. The sensor device of claim 1, further comprising:
    an output interface configured to transmit the image-processed data to an outside of the sensor device.

15. The sensor device of claim 14, wherein the output interface is further configured to transmit the image-processed data to an outside of the sensor device, in response to an object being detected in the image-processed data.

16. An image data processing method performed by a sensor device, the image data processing method comprising:
    acquiring image data using an image sensor;
    storing the acquired image data in an image buffer; and
    generating image-processed data by applying a filter, selected from among filters each having a different filter pattern, corresponding to a storage pattern of the image buffer to the image data stored in the image buffer,
    wherein a number of the filters is determined based on a number of lines of image data that can be stored in the image buffer and a size of the filters.

17. The image data processing method of claim 16, wherein the generating of the image-processed data comprises:

selecting the filter corresponding to the storage pattern of the image buffer from among the filters of different filter patterns and applying the selected filter to the image data stored in the image buffer.

18. The image data processing method of claim 16, wherein the generating of the image-processed data comprises:
generating, as the image-processed data, convolution-processed image data by applying a convolution filter for convolution processing to the image data stored in the image buffer.

19. The image data processing method of claim 16, wherein the generating of the image-processed data comprises:
generating a line of a result image by applying a convolution filter to the image data stored in the image buffer, in response to a line of the acquired image data being input and stored in the image buffer.

20. The image data processing method of claim 16, wherein the image data comprises pixels of a plurality of color components arranged in a pattern, and
the generating comprises generating the image-processed data by applying a filter corresponding to the pattern to the image data stored in the image buffer.

21. The image data processing method of claim 20, wherein the generating comprises:
applying a first filter corresponding to an arrangement pattern of first color components in the pattern to the image data stored in the image buffer; and
applying a second filter corresponding to an arrangement pattern of second color components in the pattern to the image data stored in the image buffer.

22. A non-transitory computer-readable storage medium storing instructions that, when executed by a processor, cause the processor to perform the image data processing method of claim 16.

23. A sensor device comprising:
an image sensor configured to acquire image data;
an image buffer configured to sequentially stores the image data in a unit of lines; and
an image processor configured to:
select a filter for image data currently stored in the image buffer from among the filters of a plurality of different filter patterns, based on a recently changed line of image data in the image buffer; and
process the stored image data by applying the selected filter corresponding to a storage pattern defined by lines of image data previously stored in the image buffer and a recently changed line image data most recently stored in the image buffer.

\* \* \* \* \*